(12) United States Patent
Palacios et al.

(10) Patent No.: US 6,366,667 B1
(45) Date of Patent: *Apr. 2, 2002

(54) SYSTEM FOR GENERATING A LIST OF QUALIFIED CALL RECIPIENTS

(75) Inventors: Joseph R. Palacios; Kenneth Gianino; Robert H. Witzofsky; Gregory Pace, all of Saint Louis, MO (US)

(73) Assignee: Hanover Communications, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/110,676

(22) Filed: Jul. 7, 1998

Related U.S. Application Data

(60) Provisional application No. 60/081,804, filed on Apr. 15, 1998.

(51) Int. Cl.[7] .............................................. H04M 3/523

(52) U.S. Cl. ............................. 379/266.02; 379/265.09; 379/266.07

(58) Field of Search .................................. 379/214, 216, 379/265, 266, 309, 355, 356, 214.01, 216.01, 265.01, 266.01, 266.02, 266.07, 266.08, 355.01, 356.01, 900

(56) References Cited

U.S. PATENT DOCUMENTS 5,436,965 A  *  7/1995  Grossman et al. ...... 379/265 X

* cited by examiner

Primary Examiner—Harry S. Hong
(74) Attorney, Agent, or Firm—Bose McKinney & Evans LLP

(57) ABSTRACT

A method of and apparatus for qualifying telephone numbers for use by one or more telephone service representatives. The method includes the following steps. Supplying a telephone number database containing telephone numbers and validation criteria to a qualifying computer. Launching calls with the qualifying computer to the telephone numbers in the telephone number database. Selecting called telephone numbers that meet the validation criteria as qualified telephone numbers. Establishing a qualified number queue for containing qualified telephone numbers. Providing access to the qualifying computer by the telephone service representatives to permit them to request qualified telephone numbers from the qualified number queue. Passing at least one qualified telephone number from the qualified number queue to the requesting telephone service representative. Using the requesting telephone service representative to place a call to the qualified telephone numbers passed to the requesting telephone service representative from the qualified number queue. The apparatus includes sites that are geographically distributed where each site includes a telephone and a packet-switched access device. A telephone network and a packet switched network communicate with a call qualifying computer performing the method noted above.

7 Claims, 2 Drawing Sheets

SYSTEM FOR GENERATING A LIST OF QUALIFIED CALL RECIPIENTS

CROSS REFERENCE TO RELATED APPLICATIONS

This application claims benefit of Provisional Appln. Ser. No. 60/081,804 filed Apr. 15, 1998.

This application is related to U.S. application Ser. No. 09/069,906, filed Apr. 30, 1998, entitled Device and Method for Generating a List of Qualified Call Recipients by Palacios et. al. and incorporated by reference herein.

BACKGROUND OF THE INVENTION

1. Field of the Invention

The present invention relates to a system for generating a list of qualified call recipients, and more particularly to one which electronically validates a supplied database of telephone numbers and distributes validated telephone numbers and the age of the validated numbers to telephone service representatives.

2. Description of the Related Art

Telephones have become a basic method for communicating with people and for gaining entry into a person's domain. Telephones are used in businesses for marketing (telemarketing), verifying customer identity or requirements, distributing warnings or recalls, fund raising and many other purposes. Various tools and methods have been developed to make the use of the telephone more effective for businesses in these areas. Some of these tools and methods have integrated computers with the telephone system to improve the efficiency of telephone service representatives in placing and taking calls.

One of the tools in this area is the predictive dialer which uses a computer to launch more telephone calls than the telephone service representatives can handle because it is expected that a certain percentage of the calls will either be busy, not answer, or will be answered by a machine such as an answering machine, facsimile, computer, pager or other device. The calls that are answered by a human are automatically connected by the call launching computer to an available telephone service representative through a telephone switch. Predictive dialing increases the productivity of the telephone service representatives by not having them spend time calling numbers with no one at home or busy signals. However, there are several problems with predictive dialing including the high cost of a predictive dialing systems, the requirement that telephone service representatives be co-located or closely located with the predictive dialing system, and if an telephone service representative is not available when the person answers the predictive dialing system hangs up on the potential customer. For predictive dialing systems to be cost effective there must be a minimum number of telephone service representatives located at the same calling center with the predictive dialing system at the same time. As such, current predictive dialing devices are not cost-effective for use by small (e.g. less than 10) calling centers.

SUMMARY OF THE INVENTION

A method of qualifying telephone numbers for use by one or more telephone service representatives including supplying a telephone number database containing telephone numbers and validation criteria to a qualifying computer. The computer launches calls to the telephone numbers in the telephone number database and selects called telephone numbers that meet the validation criteria as qualified telephone numbers. Validated numbers are placed on a qualified number queue used for holding the qualified telephone numbers. A telephone service representation accesses the qualifying computer to request qualified telephone numbers from the qualified number queue. At least one qualified telephone number from the qualified number queue is passed to the requesting telephone service representative along with the age of the validated number. Using the telephone number, the service representative places a call to the qualified telephone numbers.

The method can include the process of maintaining the size of the qualified number queue in a size range based on the number of available requesting telephone service representatives. The size range has an upper limit and a lower limit. The qualifying computer maintains the qualified number queue within the size range by ceasing to launch calls to the telephone numbers in the telephone number database when the number of qualified telephone numbers in the qualified number queue reaches the upper limit of the size range. The qualifying computer resuming to launch calls to the telephone numbers in the telephone number database when the number of qualified telephone numbers in the qualified number queue reaches the lower limit of the size range.

The method can include the step of using the qualifying computer to associate a time stamp with the qualified telephone number indicating the time when the qualified telephone number was selected. This supports the additional step of using the qualifying computer to compare the current time to the time when the qualified telephone number was selected to determine an elapsed time since the qualified telephone number was selected. Then the qualifying computer passes the qualified telephone number from the qualified number queue only if the elapsed time falls within a time range specified in the validation criteria.

The call qualification method can support multiple telephone number databases from a single client, or multiple clients with one or more telephone number databases. The call qualification method also supports one or more telephone service representatives working on one or more telephone number databases. A client manager can control the telephone number database to which a telephone service representative is assigned.

Preferably, the telephone number database and the validation criteria are communicated over the Internet or by other means. The call qualification system waits until one or more telephone service representatives for the client are logged onto the call qualification system locally, remotely, or over the Internet. The call qualification system then begins launching calls to telephone numbers in the client supplied database. The system analyzes each call to determine the status which could include: busy signal, ringing signal, intercept signal, no answer, modem, fax machine, answering machine, or human. The qualified telephone numbers that meet the client-specified validation criteria, are placed in a qualified call queue for communication to logged-on telephone service representatives. The telephone numbers that are not validated are flagged as to their status and placed back in the telephone number database to be retried. Telephone service representatives logged into the call qualification system request qualified telephone numbers individually or in groups from the call qualification system.

One advantage of the call qualification system and method is that it automatically pre-validates the telephone numbers according to a client selected validation criteria before they are sent to the telephone service representatives. This greatly reduces the time spent by the telephone service representatives in unproductive activities, such as encountering unwanted telephone status, such as a busy signal or no answer. The result is an increase in the productivity of the telephone service representatives.

Another advantage of the call qualification system is its ability to provide coordinated support to a plurality of telephone service representatives who are distributed at a plurality of locations remote from the qualifying computer. Use of remote logons and the Internet allows the source of the client database, the call qualification system and each of the telephone service representatives to be at different, distributed locations. Each telephone service representative location with computer or Internet access can retrieve telephone numbers from the qualified call queue. This eliminates the need for centralized phone banks at which multiple telephone service representatives must be co-located to have access to validated telephone numbers. This allows telephone service representatives to work from home or other convenient location, eliminating travel time and costs for the telephone service representative and the cost of dedicated phone banks for the client.

Still another advantage of the call qualification system is its ability to support many clients simultaneously. Without the need for co-located telephone service representatives and dedicated telephone lines, the call qualification system can be monitoring and filling the qualified call queues for several clients at the same time without affecting the activities of the telephone service representatives. This allows the call qualification system to work closer to full capacity without demanding that all the capacity come from just one or a small number of clients.

Yet another advantage of the call qualification system and method is added time flexibility. Telephone service representatives can log into the call qualification system at their convenience from any location with a telephone and direct or Internet access to the call qualification system because unlike a predictive dialing system that requires a telephone representative to be present to receive a call being handed off by the predictive dialer, the present invention permits a call to be made over a wider range of times.

Also, when compared to known predictive dialing systems, the call qualification system of the present invention is more cost effective when used with smaller groups of telephone service representatives working for a single client due to its ability to service many clients simultaneously. The flexibility in calling location, time schedule, and servicing of multiple clients enables persons to serve efficiently as telephone service representatives using the call qualification system, who might not otherwise be able to work as telephone service representatives or otherwise to participate effectively.

Additional features and advantages of the invention are set forth in the description that follows, and will become apparent to those skilled in the art upon reviewing the drawings in connection with the following description.

DETAILED DESCRIPTION OF THE PREFERRED EMBODIMENTS

Figure 1:
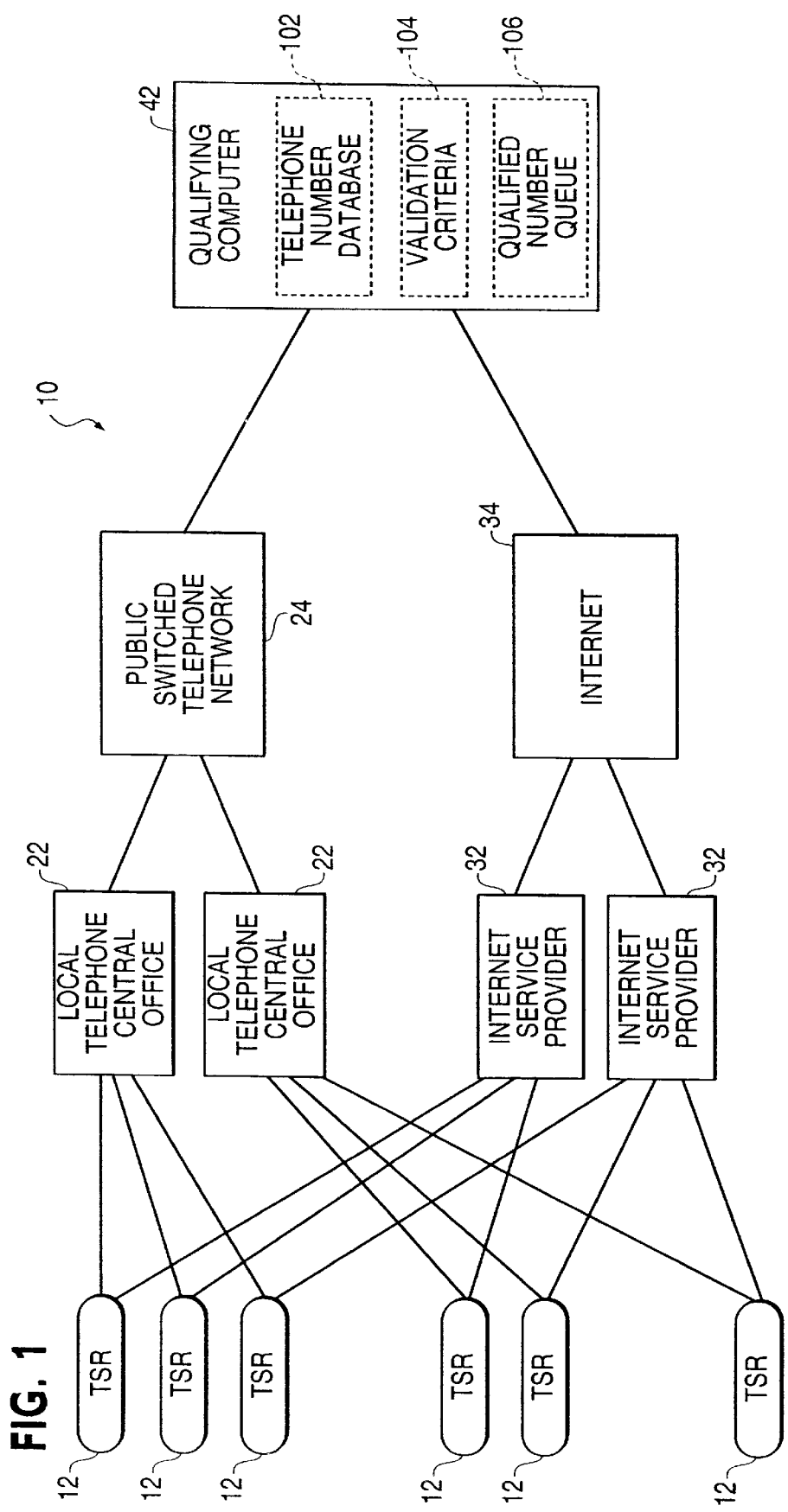
FIG. 1 is a diagram of the data connections of the call qualification system for a single client.

Turning now to FIG. 1, the interconnections used in the call qualification system 10 are shown. Telephone service representatives 12 are each connected to a local telephone central office 22 and an Internet service provider 32. The Internet service provider 32 provides the telephone service representatives 12 with access to the Internet 34. The local telephone central office 22 provides the telephone service representatives 12 with access to a public switched telephone network 24. A qualifying computer 42, which contains the software for the call qualification system 10 and which can be recorded in a computer readable storage medium, such as a disk, is also connected to the Internet 34 and the public switched telephone network 24. The qualifying computer 42 stores a client supplied telephone number database 102 and validation criteria 104 and during operation populates a qualified number queue 106.

The telephone service representatives 12 can be located at the same location using the same local telephone central office 22 and single or multiple Internet service providers 32. Alternatively, the telephone service representatives 12 can be distributed at various locations using single or multiple local telephone central offices 22 and single or multiple Internet service providers 32. The only requirement is that each telephone service representative 12 has access to both a local telephone central office 22 and an Internet service provider 32. This embodiment shows telephone service representative 12 gaining access to the qualifying computer 42 through the Internet 34, however this access could be provided by any other computer communication method, e.g. modem, local area network and other methods.

A client for whom the telephone service representatives 12 are making calls would have previously supplied the telephone number database 102 and the validation criteria 104. If the client fails to provide validation criteria 104 or provides only partial validation criteria, then the missing values can be supplied by the call qualification system from default values. The telephone number database 102 can be supplied with additional client data for each telephone number including: customer identifier, name, address, age, previous purchases, previous donations, or any other information that the client considers relevant to the customer telephone number and wants the telephone service representative 12 to be made aware of when making the call. This additional data would remain associated with the telephone number and when a qualified telephone number is passed to a telephone service representative 12 from the qualified number queue 106 this information would also be passed to the telephone service representative 12. The validation criteria 104, supplied by the client, includes the status required for a telephone number before it is transferred to the qualified number queue 106 to be made available to the telephone service representatives 12. Typically, the validation criteria 104 supplied by the client will instruct that the telephone number be answered by a human being.

The qualifying computer 42 can determine many telephone statuses, including: busy signal, ringing signal, intercept signal, no answer, modem, fax machine, answering machine, or human. In order to determine the statuses, the qualifying computer 42 has procedures which test the signal being produced by the called telephone number (e.g. busy signal, human voice) to determine whether the signal produced meets the client's desired validation criteria (e.g. a human voice) or is otherwise an undesired signal (e.g. a busy signal). In order to determine the difference between these types of signals, the applicant's have found that digital signal processing boards D/240SC-T1 and D/480SC-2T1, which are commercially available from Dialogic Corporation, 515 Route Ten, Parsippany, N.J., work well.

The qualified number queue 106 stores telephone numbers from the telephone number database 102 that have met the status of the validation criteria 104 and are ready to be passed to telephone service representatives 12 as qualified telephone numbers. The queue 106 can also store the time at which a telephone number was validated, from which the age of the validated telephone number can be calculated.

The flow of information through the call qualification system 10 shown in FIG. 1 would be as follows. A client supplies the telephone number database 102 and the client-desired validation criteria 104 prior to the telephone service representatives 12 logging onto the call qualification system 10. The qualifying computer 42 can be notified that telephone service representatives 12 will be logging on at a particular time and to have the qualified number queue 106 ready. Alternatively, the populating of the qualified number queue 106 can begin when the telephone service representatives 12 begin logging on. The qualifying computer 42 computes a desired size range for the qualified number queue 106 based on the number of active telephone service representatives 12, and preferably the average call duration being experienced. The function relating qualified number queue 106 size to number of active telephone service representatives 12 can be supplied by the client as part of the validation criteria 104 or computed by a default function resident on the qualifying computer 42. The size of the qualified number queue (and hence the average residence time of a qualified telephone number on the qualified number queue) is managed to keep qualified numbers from becoming stale, having their status change, between validation by the qualifying computer 42 and a call being placed by the telephone service representative 12.

The qualifying computer 42 launches calls through the public switched telephone network 24 to the numbers in the telephone number database 102. The qualifying computer 42 determines the status of the telephone number and takes the appropriate action. The client, as part of the validation criteria 104, can specify the action it wants the qualifying computer 42 to take for each status detected. For example, if a human answers the client-desired validation criteria can specify that the computer hang up, and then transfer the number, along with the time of the validation, to the qualified number queue 106 as a qualified number to be called by a telephone service representative 12. Alternatively, if a busy signal or fax machine is encountered the client-desired validation criteria 104 can specify that the particular number be maintained in the telephone number database 102 for later retry. Similarly, if an answering machine is encountered, the telephone number can be returned to the telephone number database 102 for later retry, or as an alternative, the client supplied validation criteria 104 can specify that a message be left on the answering machine and the particular number can be flagged as one wherein a message was left, although no known contact was made, so that if the call is not returned, the number can be retried at a later time. Further, if a number is no longer in use, then it can be flagged as inoperative and not retried.

The action to be taken for each status can be specified by the client or a default action will be taken. The telephone number is flagged as to its status and acted upon according to the instructions in the validation criteria 104; if appropriate the telephone number is transferred to the qualified number queue 106. When the qualified number queue 106 reaches the upper limit of the desired size range, the qualifying computer 42 ceases to launch calls to additional numbers in the telephone number database 102. The qualifying computer 42 will resume launching calls to numbers in the telephone number database 102 when the qualified number queue 106 reaches the lower limit of the desired size range.

The telephone service representatives 12 logs onto the qualifying computer 42 through an Internet service provider 32 and the Internet 34 The qualifying computer 42 verifies the telephone service representative's user identification and security information and the client for whom the telephone service representative 12 is to make calls.

After successfully logging on, the telephone service representative 12 requests one or more qualified telephone numbers from the qualified number queue 106. The number of qualified telephone numbers that can be passed from the qualified number queue 106 to the telephone service representatives 12 at one time can be specified by the client as part of the validation criteria 104. The qualifying computer 42 passes telephone numbers from the qualified number queue 106 along with any associated data over the Internet 34 to the requesting telephone service representative 12. The computer 42 can also determine the age of the validated call, preferably in minutes, from the time of validation which can also be stored in the queue 106. This information can also be passed to the service representative 12 over the network connection. The telephone service representative 12 will make calls to the received qualified numbers through the local telephone central office 22 and the public switched telephone network 24. When the telephone service representative 12 has acted upon all of the received qualified numbers then the telephone service representative 12 will request more qualified numbers from the qualified number queue 106 on the qualifying computer 42 through the Internet service provider 32 and the Internet 34. The qualifying computer 42 tracks the number of telephone service representatives 12 calling for the client, and the telephone service representatives 12 inform the system when they plan to stop calling or take breaks, so that the qualifying computer 42 can determine the desired range for the number of telephone numbers to have in the qualified number queue 106.

The qualifying computer 42 maintains a client report which lists the status of each telephone number in the telephone number database 102 and the action taken for that telephone number. A client manager 44 can view the client report either locally or remotely while the qualifying computer 42 and telephone service representatives 12 are actively processing the associated telephone number database 102 or the client manager 44 can view the report after processing has ceased on the associated telephone number database 102. The client manager 44 can communicate with the qualifying computer 42 through the Internet, modem, local area network or other computer-to-computer communication technique. FIG. 1 shows the client manager 44 connected to the qualifying computer through the Internet service provider 32 and Internet 34.

The client manager 44 can update the validation criteria 104 or override a telephone number status in the telephone number database 102. If a particular client has more than one telephone number database 102, each having an associated validation criteria 104 and qualified number queue 106, the client manager 44 can reassign one or more telephone service representatives 12 currently working on one telephone number database to another telephone number database. The reassignment of the telephone service representative 12 will take place at the telephone service representative's next request of qualified telephone numbers from the qualified number queue 106. The qualifying computer 42 will also send client supplied information to the reassigned telephone service representative 12 informing the telephone service representative 12 of the reassignment and the appropriate actions to be taken for the new numbers from the new qualified number queue 106.

Figure 2:
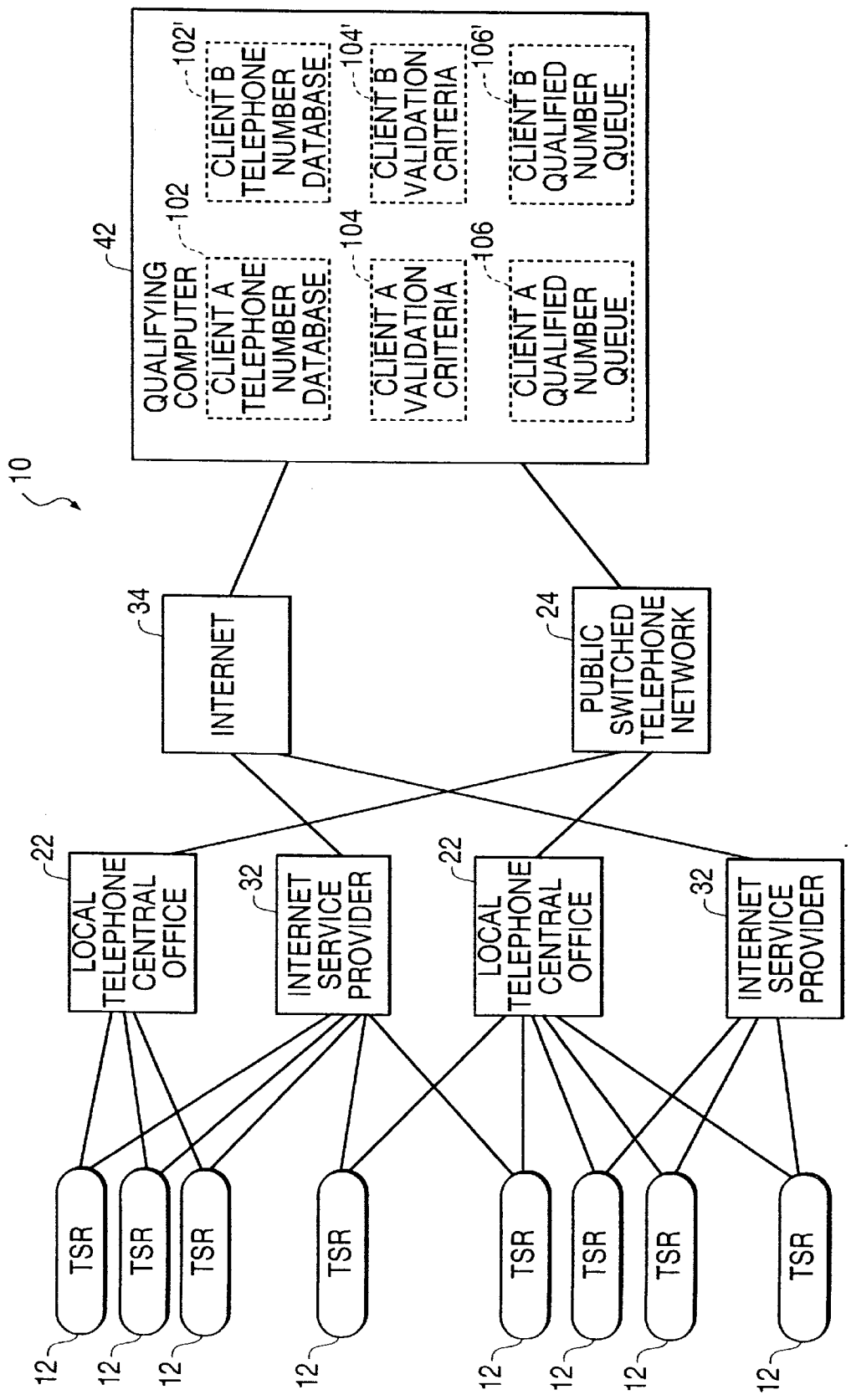
FIG. 2 is a diagram of the data connections of the call qualification system for two clients.

FIG. 2 shows the call qualification system to support multiple clients. Client A has multiple telephone service representatives 12 either co-located or dispersed, each of client A's telephone service representatives 12 having access to a local telephone central office 22 and an Internet service provider 32. Client B also has multiple telephone service representatives 12' either co-located or dispersed. Each of client B's telephone service representatives 12' also have access to a local telephone central office 22 and an Internet service provider 32. The local telephone central offices 22 and the Internet service providers 32 can be the same or different for each of the telephone service representatives 12, 12' of clients A and B. The flow of data is the same as described in FIG. 1 except that the qualifying computer 42 independently stores and processes a client telephone number database 102, 102' and client validation criteria 104, 104' for each of client A and client B, respectively. During operation the qualifying computer 42 will populate the client A qualified number database 106 with telephone numbers from the client A telephone number database 102 according to the parameters in the client A validation criteria 104. Additionally, the qualifying computer 42 will independently populate the client B qualified number database 106 with telephone numbers from the client B telephone number database 102 according to the parameters in the client B validation criteria 104. Client A has a client manager 44 and client B has a client manager 44'. Each client can have one or more telephone number databases 102 and for each telephone number database there will be an associated validation criteria 104 and a qualified number queue 106.

The validation criteria 104 can also include a time window specifying a minimum and maximum elapsed time between when a telephone number in the qualified number queue 106 was validated and when it is passed to a telephone service representative 12. The minimum elapsed time parameter prevents the telephone service representative 12 from calling a telephone number too soon after the qualifying computer 42 made the validation call, to reduce the likelihood that the call recipient will associate the telephone service representative's call with the qualifying computer validation call. The maximum elapsed time parameter prevents the telephone service representative 12 from calling telephone numbers too long after the qualifying computer 42 made the validation call. As will be appreciated, the passage of an extended time between a qualifying (validation call and a telephone service representative's call) increases the probability that the status of the telephone number has changed to an unwanted status. Before the qualifying computer 42 passes a telephone number from the qualified number queue 106 to a requesting telephone service representative 12, it will compare a time stamp placed on the qualified telephone number when it was validated against the current time to calculate the elapsed time. If the elapsed time since validation falls within the allowable time window then the number from the qualified numbers queue 106 will be passed to the requesting telephone service representative 12. Otherwise, the telephone number will lose its "qualified" status and will be removed from the qualified numbers queue 106 and be returned to the telephone number database 102. When so returned, the particular number can be re-validated if so desired.

The features and actions discussed herein are described in greater detail in the C++ source code of the Appendix. These processes can be stored on a recording medium such as a floppy disk, a CD ROM, or transmitted over a network such as the Internet.

It will be understood that various modifications can be made to the apparatus disclosed in this application without changing the scope of the invention.

VI. APPENDIX

Dkt.: 1370.1002

16
```
/***************************************************************
 *
 *             File Name:    predDial.C
 *        SCCS File Name:    /NNC/src/fax/SCCS/s.predDial.C
 *                 Tasks:    Outbound Voice Port
 *                Author:    Bob Witzofsky
 *          Date Created:    July 4, 1997
 *       Date Last Delta:    14:40:54 @ 5/21/98
 *           Current SID:    1.1
 *      General Comments:    Launches calls looking specifically for PERSON
 *                           ANSWER. Message left for MACHINE_ANSWER.
 *
 *      Revision History:    Date         Reason
 *                           --------     --------------------------------
 ***************************************************************/ void predictiveDial(VoicePortRequest& rqst, ServAddr& from, DCE& dce, VoiceExtra
{
        String dialStr((const char *)rqst.phone);
        String message((const char *)rqst.from.ip);
        String relPath("qcall/");
        relPath += message;

cout << "Calling: " << dialStr << endl;
        cout << "Message: " << relPath << endl;

Stopwatch timer;
        timer.start();

CallAnalysis ca = dx.dial(dialStr);
        cout << "Call analysis " << convert(ca) << " " << (CallProgress)dx << en // We want to leave a message, if one is specified
        if (ca == MACHINE_ANSWER && !message.is_empty()) {
                dx.play(relPath, "");
        } cout << "Building response" << endl;
        VoicePortResponse rspn;
        rspn.obj.result = ca;
        rspn.obj.timeSlot = timer.real();
        rspn.from = (const char *)dialStr;
        cout << "Sending: " << rspn << " to: " << from << endl;
        dce.send(rspn, from);

}
```

17

```
/******************************************************************
 *
 *            File Name:  qcall.C
 *       SCCS File Name:  /NNC/src/cgi/SCCS/s.qcall.C
 *                Tasks:  Qaulified Call Web/CGI interface
 *               Author:  Bob Witzofsky
 *         Date Created:  June 20, 1997
 *       Date Last Delta: 14:36:57 @ 5/21/98
 *          Current SID:  1.3
 *      General Comments: CGI program which takes as input HTTP/POST
 *                        requests and output HTML docs and forms.
 *                        Interfaces with the Qualified Number server
 *                        to obtain Pre-Qualified numbers.
 *
 *      Revision History:    Date       Reason
 *                         --------   ----------------------------------
 ******************************************************************/
static char *what_string = "@(#)qcall.C 1.3 98/05/21 14:37:21 ";

#include <iostream.h>
#include <fstream.h>
#include <stdio.h>
#include <stdlib.h>
#include <string.h>
#include <String.h>
#include <Args.h>
#include <Time.h>
#include <Regex.h>
#include <sys/time.h>
#include "nnc.h"
#include "qcall.h"

define MAX_ENTRIES 10000 typedef struct {
    char *name;
    char *val;
} entry;

extern "C" {
char *makeword(char *line, char stop);
char *fmakeword(FILE *f, char stop, int *len);
char x2c(char *what);
void unescape_url(char *url);
void plustospace(char *str);
}

RsrcId qcallMgr("qcallMgr");
String qcallAgents("/NNC/etc/agents");

Boolean lookupId(const String& agentId, const String& remoteAddr,
                 String& group, String& company);

main(int argc, const char *argv[]) {
```

```
                                    18
    cout << "Content-type: text/html" << (char)10 << (char)10 << endl;
    cout << "<CENTER>";
    cout << "<H1>Pre-Qualified Numbers</H1>";

Args args(argc, argv, "");
    int num = 4;
    String agentId;
    String group;
    String company;
    String logoff;

if (args.nargs() >= 1) {
            agentId = args.arg(0);
            int tmp = atoi(args.arg(1));
            if (tmp > 0 && tmp < 20)
                    num = tmp;
            group = args.arg(2);
            logoff = args.arg(3);
    }
else if(strcmp(getenv("REQUEST_METHOD"),"POST")) {
    cout << "This script should be referenced with a METHOD of POST\n";
    exit(1);
}
else if(strcmp(getenv("CONTENT_TYPE"),"application/x-www-form-urlencoded"))
    {
    cout << "This script can only be used to decode form results\n";
    exit(1);
}

// Read standard input for FORM contents
    String remoteAddr((const char *)getenv("REMOTE_ADDR"));
    String serverName((const char *)getenv("SERVER_NAME"));
    String scriptName((const char *)getenv("SCRIPT_NAME"));
    cout << "<FORM METHOD=\"POST\" ACTION=\"http://"
            << serverName << scriptName << "\">\n";

int contentLength = atoi(getenv("CONTENT_LENGTH"));
    while (contentLength && !feof(stdin)) {
            char *val = fmakeword(stdin, '&', &contentLength);
            plustospace(val);
            unescape_url(val);
            const char *name = makeword(val, '=');

if (!strcmp(name, "Request"))
                    agentId = val;
            else if (!strcmp(name, "Number"))
                    num = atoi(val);
            else if (!strcmp(name, "Group"))
                    group = val;
            else if (!strcmp(name, "Logoff"))
                    logoff = val;
    } agentId = agentId.upper();
    group = group.upper();
    if (!lookupId(agentId, remoteAddr, group, company)) {
            cout << "<INPUT TYPE=\"hidden\" NAME=\"Number\" VALUE=\""
                    << num << "\">\n";
            return 1;
```

```
                                    19
}
putenv("RSRC_MGR=iodine:3700");
DCE dce("local");
QDialRequest rqst;
strncpy(rqst.obj.company, company, sizeof(rqst.obj.company));
rqst.obj.company[sizeof(rqst.obj.company)-1] = 0;

strncpy(rqst.obj.group, group, sizeof(rqst.obj.group));
rqst.obj.group[sizeof(rqst.obj.group)-1] = 0;

strncpy(rqst.obj.agentId, agentId, sizeof(rqst.obj.agentId));
rqst.obj.agentId[sizeof(rqst.obj.agentId)-1] = 0;

rqst.obj.num = num;
if (logoff == "No")
        rqst.obj.logoff = TRUE;
else
        rqst.obj.logoff = FALSE;

rqst.remoteAddr = (const char *)remoteAddr;
dce.send(rqst, qcallMgr);

QDialResponse rspn;
ServAddr from;
int numRet = 0;
if (dce.receive(rspn, from, 3000))
        numRet = rspn.obj.num;

cout << "<TABLE BORDER>\n"
        << "<TH>\n"
        << "<TH>Customer ID\n"
        << "<TH>Telephone #\n"
        << "<TH>Age (minutes)\n"
        << "<TR>\n"
        << endl;

Time now = make_time("now");
for (int i = 0; i < numRet; i++) {

String cust = rspn.obj.rows[i].custId;
        String tmp = rspn.obj.rows[i].phoneNo;
        String telno("(");
        telno += tmp(0,3);
        telno += ")-";
        telno += tmp(3,3);
        telno += "-";
        telno += tmp(6,4);

Duration dur = now - make_time(rspn.obj.rows[i].time);

cout << "<TD>" << i+1 << "</TD>\n"
                << "<TD>" << cust << "</TD>\n"
                << "<TD>" << telno << "</TD>\n"
                << "<TD>" << dur.make_string("%Hh %Mm") << "</TD>\n"
                << "<TR>" << endl;
}
for (; i < 5; i++) {
        cout << "<TD>" << i+1 << "</TD>\n"
```

```
                                20
                    "<TD><BR></TD>\n"
                << "<TD><BR></TD>\n"
                << "<TD><BR></TD>\n"
                << "<TR>" << endl;
    } cout << "</TABLE>\n";
    cout << "<TABLE>\n";
    cout << "<TD>Request Next List for ID "
         << "<TD><INPUT TYPE=\"submit\" NAME=\"Request\" VALUE=\""
         << agentId << "\">\n";
    cout << "<TR>\n";
    cout << "<TD>From GROUP\n";
    cout << "<TD><SELECT NAME=\"Group\">\n";
    cout << "<OPTION>" << group << "\n";
    cout << "</SELECT>\n";
    cout << "<TR>\n";
    cout << "<TD>Of size (indicate Size)\n";
    cout << "<TD><SELECT NAME=\"Number\">\n";
    for (i = 1; i <= 5; i++) {
        if (i == num)
            cout << "<OPTION SELECTED>" << i << '\n';
        else
            cout << "<OPTION>" << i << '\n';
    }
    cout << "</SELECT>\n";
    cout << "<TR>\n";
    cout << "<TD>Continue filling my Queue\n";
    cout << "<TD><SELECT NAME=\"Logoff\">\n";
    cout << "<OPTION SELECTED>Yes\n";
    cout << "<OPTION>No\n";
    cout << "</SELECT>\n";
    cout << "</TABLE>\n";

cout << "<BR>To use a <A HREF=\"http://"
         << serverName << "\">\n"
         << " different</A> ID or GROUP\n";

return 0;
}

Boolean lookupId(const String& agentId, const String& remoteAddr,
            String& group, String& company)
{
        ifstream agentFile(qcallAgents);

Regex reg("[^\t]*(\t|$|\n|\r)");
        Regex noDel("[^\t\r\n]*");
        char buf[200];
        String groupS[10];
        int matches = 0;

String matchingGroup;
        String matchingCompany;

while (agentFile.getline(buf, sizeof(buf))) {
```

```
                        21
        // comment lines start with a #
        if (buf[0] == '#')
                continue;

Regexiter iter(reg, buf);
        String tmp;
        iter.next(tmp);
        String agnt;
        noDel.match(tmp, agnt);
        if (agnt.is_empty())
                continue;

iter.next(tmp);
        String comp;
        noDel.match(tmp, comp);

iter.next(tmp);
        String grp;
        noDel.match(tmp, grp);

iter.next(tmp);
        String ip;
        noDel.match(tmp, ip);

// We've found a match if the agent, addr, and group all match
        if (agentId == agnt && ip == remoteAddr(0, ip.length())) {
                if (group.is_empty() || group == grp) {
                        groupS[matches] = grp;
                        if (matches < 9)
                                matches++;
                        matchingGroup = grp;
                        matchingCompany = comp;
                }
        }
} if (matches == 1) {
        group = matchingGroup;
        company = matchingCompany;
        return TRUE;
} if (matches == 0)
        cout << "<BR>A matching id was not found.<P>" << endl;
else {
        cout << "<BR>Please select a group\n";
        cout << "<SELECT NAME=\"Group\">\n";
        for (int i = 0; i < matches; i++)
                cout << "<OPTION>" << groupS[i] << endl;
        cout << "</SELECT>\n";
        cout << "for ID "
                << "<INPUT TYPE=\"submit\" NAME=\"Request\" VALUE=\""
                << agentId << "\">\n";
} return FALSE;
```

```
/*********************************************************************
 *
 *              File Name:    qcall.C
 *         SCCS File Name:    /NNC/src/recalls/pcs/SCCS/s.qcall.C
 *                  Tasks:    Qaulified Number Server
 *                 Author:    Bob Witzofsky
 *           Date Created:    May 20, 1997
 *        Date Last Delta:    14:34:59 @ 5/20/98
 *            Current SID:    1.5
 *       General Comments:    Interface between the cgi executable and the
 *                            outbound voice ports.
 *
 *       Revision History:    Date       Reason
 *                            --------   ------------------------------
 *********************************************************************/
static char *what_string = "@(#)qcall.C 1.5 98/05/20 14:34:59 ";

#include <Args.h>
#include <String.h>
#include <Time.h>
#include <iostream.h>
#include <fstream.h>
#include <stdlib.h>
#include "voice.h"
#include "dce.h"
#include "rManager.h"
#include "voicePort.h"
#include "qcall.h"
#include "qtable.h"

void process(QInfoRequest *objP, ServAddr& from);
void process(QDialRequest *objP, ServAddr& from);
void process(VoicePortResponse *objP, ServAddr& from);
void process(ResourceResponse *objP, ServAddr& from);
void checkQueues(void);

RsrcId sprintVoicePort("sprintVoicePort");
RsrcId qcallMgr("qcallMgr");
DCE dce(qcallMgr);
Map<String, QRec> respMap;

QTable tbl("/NNC/etc/qcall");

main(int argc, const char *argv[]) {

Args args(argc, argv, "");

dce.reg();

dce.add((ObjCreator)QInfoRequest::create, QInfoRequest::info());
        dce.add((ObjCreator)QDialRequest::create, QDialRequest::info());
        dce.add((ObjCreator)VoicePortResponse::create, VoicePortResponse::info());
        dce.add((ObjCreator)ResourceResponse::create, ResourceResponse::info());

ServAddr from;

for (;;) {
```

```
                        checkQueues();           23
                        Obj *objP = dce.receive(from, 10000);
                        if (objP == 0) {
                                continue;
                        }
                        if (objP->id() == QDialRequest::info())
                                process((QDialRequest*)objP, from);
                        else if (objP->id() == VoicePortResponse::info())
                                process((VoicePortResponse *)objP, from);
                        else if (objP->id() == ResourceResponse::info())
                                process((ResourceResponse *)objP, from);
                        else if (objP->id() == QInfoRequest::info())
                                process((QInfoRequest*)objP, from);
                        else
                                cout << "Got unexpected message from " << from << endl;
                        delete objP;
                }
        }

/* void process(QDialRequest *objP, ServAddr& from)
 *
 * A QDialRequest contains a company code and group id which indicate which
 * number queue to grab numbers from. The passed remoteAddr and agentId
 * are used only for logging the calls that were handed-off to an agent.
 *
 */
void process(QDialRequest *objP, ServAddr& from) { cout << make_time("now") << " QDialRequest: " << *objP << endl;

QRec *array = new QRec[objP->obj.num];
        int num = tbl.getList(objP->obj.company, objP->obj.group, array,
                objP->obj.num, objP->obj.agentId, objP->obj.logoff);

QDialResponse rspn;
        for (int i = 0; i < num; i++) {
                strncpy(rspn.obj.rows[i].custId, array[i].custId,
                        sizeof(rspn.obj.rows[i].custId));
                rspn.obj.rows[i].custId[sizeof(rspn.obj.rows[i].custId)-1] = 0;
                strncpy(rspn.obj.rows[i].phoneNo, array[i].phoneNo,
                        sizeof(rspn.obj.rows[i].phoneNo));
                rspn.obj.rows[i].phoneNo[sizeof(rspn.obj.rows[i].phoneNo)-1] = 0
                strcpy(rspn.obj.rows[i].time, array[i].time.make_string("%r"));

array[i].set(objP->obj.agentId, objP->remoteAddr.ip);
                tbl.log(array[i]);
        }
        rspn.obj.num = num;
        dce.send(rspn, from);

cout << make_time("now") << "NUM: " << num << " " << objP->obj.num-num
                << endl;

delete array;
}
```

```
                                              24
/* void process(QInfoRequest *objP, ServAddr& from)
 *
 * A QInfoRequest contains a company code and group id which indicate which
 * number queue to grab information for. The QInfoResponse contains info
 * regarding the number of agents, queue depth, which are pulled from the
 * qcall manager.
 */
void process(QInfoRequest *objP, ServAddr& from) { cout << make_time("now") << " QInfoRequest: " << *objP << endl;

QInfo info;
        tbl.getInfo(objP->obj.company, objP->obj.group, info);

QInfoResponse rspn;
        rspn.obj.agents  = info.agents;
        rspn.obj.retry   = info.retry;
        rspn.obj.input   = info.input;
        rspn.obj.depth   = info.depth;
        rspn.obj.handoff = info.handoff;
        rspn.obj.machine = info.machine;

dce.send(rspn, from);
}

/* void process(ResourceResponse *rspnP, ServAddr& from)
 *
 * The resource response will be a voicePort that we can use to dial a
 * number in the queue.
 */
void process(ResourceResponse *rspnP, ServAddr& from) { cout << "ResourceResponse: " << *rspnP << endl;
        if (rspnP->obj.type != Inquire) {
                cout << "Received the wrong type of Resourse response" << endl;
                return;
        } if (!(rspnP->name == sprintVoicePort)) {
                cout << "Wrong Resource type received" << *rspnP << endl;
                return;
        }

ServAddr voiceAddr(rspnP->addr);
        if (!voiceAddr) {
                tbl.removeRqst();
                cout << "No available resources at this time" << endl;
                return;
        }

// Find a telephone number we need to dial
        QRec qrec;
        if (!tbl.findRqst(qrec)) {
                cout << "No Telephone numbers to dial" << endl;
                // We need to give up the voicePort, since we can't use it
                ResourceRequest rqst;
                rqst.addr = rspnP->addr;
```

```
                            25
            rqst.obj.port = rspnP->obj.port;
            rqst.name = rspnP->name;
            rqst.obj.type = Register;

cout << "Send Request: " << rqst << endl;

dce.sendToRsrcMgr(rqst);
            return;
    }

String voiceStr(voiceAddr.ip);
    voiceStr += int_to_str(voiceAddr.port());
    respMap[voiceStr] = qrec;
    VoicePortRequest rqst(qrec.phoneNo);
    rqst.obj.application = PredictiveDial;
    String msg(qrec.company);
    msg += qrec.group;
    rqst.from = (const char *)msg;
    dce.send(rqst, voiceAddr);

cout << "Sending: " << rqst << " to: " << voiceAddr << endl;
}

/* void process(VoicePortResponse *rspnP, ServAddr& from)
 *
 * Result of dialing a number
 *
 */
void process(VoicePortResponse *rspnP, ServAddr& from) {

String voiceStr(from.ip);
    voiceStr += int_to_str(from.port());

cout << "VoicePortResponse: " << *rspnP << " from: " << from << endl;
    if (!respMap.element(voiceStr)) {
            cout << "Unexpected response: " << *rspnP << " from " << from <<
            return;
    }

QRec& qrec = respMap[voiceStr];
    if (qrec.phoneNo != rspnP->from.ip) {
            cout << "PhoneNo: " << qrec.phoneNo << " != " << rspnP->from.ip
    }
    else {
            qrec.set(rspnP->obj.result, rspnP->obj.timeSlot);
            tbl.putNumber(qrec);
    }
    respMap.remove(voiceStr);
}

/* checkQueues: We may have to look if we have to place more calls here.
 * For example, we may have launched a bunch of calls but received few
 * person answers
 */
void checkQueues() {
        return;
```

}

```
/*********************************************************************
 *
 *            File Name:  qtable.h
 *       SCCS File Name:  /NNC/src/recalls/pcs/SCCS/s.qtable.h
 *                Tasks:  Qaulified Number Server
 *               Author:  Bob Witzofsky
 *         Date Created:  May 20, 1997
 *      Date Last Delta:  14:39:23 @ 5/20/98
 *          Current SID:  1.3
 *     General Comments:  Table which maintains requests and outbound
 *                        calls placed by voice ports.
 *
 *     Revision History:  Date        Reason
 *                        --------    ---------------------------------
 *********************************************************************/ ifndef _QTABLE_H_
define _QTABLE_H_ include <Map.h>
include <List.h>
#include <Time.h>
#include "qrec.h"

class QCallItem {
public:
        String company;
        String group;
        String custId;
        String phoneNo;
        Time time;

QCallItem() {}
        ~QCallItem() {}
};

class AgentInfo {
public:
        Time time;
        int num;

AgentInfo() {}
        ~AgentInfo() {}
};

class QInfo {
public:
        int agents;
        int retry;
        int input;
        int depth;
        int machine;
        int handoff;
        void clear() {agents = retry = input = depth = machine = handoff = 0;}

QInfo() {}
        ~QInfo() {}
```

};

28

```
class QGroup {
private:
        Map<String, AgentInfo> agents;
        List_of_p<QCallItem> in;
        List_of_p<QRec> retry;
        List_of_p<QRec> out;
        String directory;
        Time morningLimit;
        Time eveningLimit;
        int lastLoad;
        int need;
        int handoff;
        int machine;
        Boolean loadNewFile;
        Boolean loadFile(const Time& now);

public:
        void getInfo(QInfo& info);
        void setDir(const String& dir) {directory = dir;}
        int getList(QRec array[], int num, int& more, Boolean logoff);
        void putRetry(const QRec& rec);
        void putNumber(const QRec& rec);
        void log(const QRec& rec);
        void addAgent(const String& agent, int num, Boolean logoff);
        QRec *getNumber();
        void addMachine() {machine++;}

QGroup() : morningLimit(make_time("09:00:00 AM")), need(0),
                   eveningLimit(make_time("08:05:00 PM")), lastLoad(0), loadNewFile
        {}
        ~QGroup() {}
};

class QTable {
private:
        String confFile;
        Map<String, QGroup> qgroups;
        String index(const String& company, const String& group);
        List_of_p<QCallItem> rqsts;

public:
        QTable(const char *conf);
        ~QTable() {} void getInfo(const String& company, const String& group, QInfo& info);
        int getList(const String& company, const String& group,
                QRec array[], int num, const String& agent, Boolean logoff);
        void putNumber(const QRec& qrec);
        void addRqst(const String& company, const String& group);
        Boolean QTable::findRqst(QRec& qrec);
        void removeRqst();
        void log(const QRec& rec);
};
```

```
#endif /* _QTABLE_H_ */
```

30

```
/********************************************************************
 *
 *              File Name:    qrec.h
 *         SCCS File Name:    /NNC/src/recalls/pcs/SCCS/s.qrec.h
 *                  Tasks:    Qaulified Number Server
 *                 Author:    Bob Witzofsky
 *           Date Created:    May 20, 1997
 *        Date Last Delta:    14:39:22 @ 5/20/98
 *            Current SID:    1.2
 *       General Comments:    QRec C++ class declaration/definition
 *
 *       Revision History:    Date       Reason
 *                            --------   --------------------------------
 ********************************************************************/ ifndef _Q_REC_H_
define _Q_REC_H_ include <String.h>
include <iostream.h>
include <Time.h> include "nnc.h"

class QRec {
public:
        const char fs = '\t';

enum Success {
                person=1, machine, noAnswer, busy, fastBusy, modem,
                networkError, intercept, informationTone, other
        };

String company;
        String group;
        String custId;
        String phoneNo;
        Time time;
        Success caResult;
        int callLength;
        String agentId;
        Time handoff;

int callAnalysis;
        double callSetupSeconds;
        double holdTimeSeconds;
        Success best;
        int attempt;
        String retry;

friend ostream& operator<< (ostream& os, const QRec& cr);
        friend istream& operator>> (istream& os, QRec& cr);

QRec(const char *buf);
        QRec() : attempt(0), caResult(other), holdTimeSeconds(0),
                callSetupSeconds(0), retry("D"), callAnalysis(-1), best(other),
                callLength(0) {}
```

31

```
    QRec(const String& c, const String& p) : custId(c), phoneNo(p),
        attempt(0), callLength(0),
        caResult(other), holdTimeSeconds(0), callSetupSeconds(0),
        time(make_time("now")), retry("D"), callAnalysis(-1), best(other
    void set(const char *ag, const char *ip);
    void set(int res, int length);
    void log() {cout << *this;}

~QRec() {}
};

#endif /* _Q_REC_H_ */
```

```
/*****************************************************************
 *
 *        File Name:        qtable.h
 *        SCCS File Name:   /NNC/src/recalls/pcs/SCCS/s.qtable.h
 *        Tasks:            Qaulified Number Server
 *        Author:           Bob Witzofsky
 *        Date Created:     May 20, 1997
 *        Date Last Delta:  14:39:23 @ 5/20/98
 *        Current SID:      1.3
 *        General Comments: Table which maintains requests and outbound
 *                          calls placed by voice ports.
 *
 *        Revision History: Date       Reason
 *                          --------   ------------------------------
 *****************************************************************/
#ifndef _QTABLE_H_
define _QTABLE_H_ include <Map.h>
include <List.h>
#include <Time.h>
#include "qrec.h"

class QCallItem {
public:
        String company;
        String group;
        String custId;
        String phoneNo;
        Time time;

QCallItem() {}
        ~QCallItem() {}
};

class AgentInfo {
public:
        Time time;
        int num;

AgentInfo() {}
        ~AgentInfo() {}
};

class QInfo {
public:
        int agents;
        int retry;
        int input;
        int depth;
        int machine;
        int handoff;
        void clear() {agents = retry = input = depth = machine = handoff = 0;}

QInfo() {}
        ~QInfo() {}
```

```
                                  33
};

class QGroup {
private:
        Map<String, AgentInfo> agents;
        List_of_p<QCallItem> in;
        List_of_p<QRec> retry;
        List_of_p<QRec> out;
        String directory;
        Time morningLimit;
        Time eveningLimit;
        int lastLoad;
        int need;
        int handoff;
        int machine;
        Boolean loadNewFile;
        Boolean loadFile(const Time& now);

public:
        void getInfo(QInfo& info);
        void setDir(const String& dir) {directory = dir;}
        int getList(QRec array[], int num, int& more, Boolean logoff);
        void putRetry(const QRec& rec);
        void putNumber(const QRec& rec);
        void log(const QRec& rec);
        void addAgent(const String& agent, int num, Boolean logoff);
        QRec *getNumber();
        void addMachine() {machine++;}

QGroup() : morningLimit(make_time("09:00:00 AM")), need(0),
                eveningLimit(make_time("08:05:00 PM")), lastLoad(0), loadNewFile
        {}
        ~QGroup() {}
};

class QTable {
private:
        String confFile;
        Map<String, QGroup> qgroups;
        String index(const String& company, const String& group);
        List_of_p<QCallItem> rqsts;

public:
        QTable(const char *conf);
        ~QTable() {} void getInfo(const String& company, const String& group, QInfo& info);
        int getList(const String& company, const String& group,
                QRec array[], int num, const String& agent, Boolean logoff);
        void putNumber(const QRec& qrec);
        void addRqst(const String& company, const String& group);
        Boolean QTable::findRqst(QRec& qrec);
        void removeRqst();
        void log(const QRec& rec);
};
```

```
#endif /* _QTABLE_H_ */
```

What is claimed is:

1. A method, comprising:

dialing calls to telephone numbers in a telephone number database;

disconnecting the calls upon determining whether the telephone numbers satisfy call qualifying criteria; and placing the telephone numbers satisfying the call qualifying criteria in a qualified number queue.

2. The method of claim 1, further comprising varying a queue size of the qualified number queue responsive to a number of telephone service representatives accessing the qualified number queue.

3. The method of claim 1, further comprising removing telephone numbers from the qualified number queue within a predetermined period of time.

4. The method of claim 1, further comprising:

providing telephone numbers to telephone service representatives from the qualified number queue upon request allowing the representatives to call the telephone numbers provided; and updating the qualified number queue to remove telephone numbers provided to the representatives.

5. The method of claim 4, further comprising providing an age of the telephone numbers satisfying the call qualifying criteria.

6. An apparatus, comprising:

telephone service representative sites geographically distributed and each comprising a telephone and a packet-switched access device;

a telephone network and a packet-switched network coupled respectively to the telephone and the access device; and a call qualifying computer coupled to the telephone network and the packet-switched network, dialing calls to telephone numbers in a telephone number database, disconnecting the calls upon determining whether the telephone numbers satisfy call qualifying criteria, placing the telephone numbers satisfying the call qualifying criteria in a qualified number queue, providing qualified telephone numbers from the qualified number queue to a telephone service representative via the packet-switched network and the access device, allowing the representative to call the telephone number via the telephone.

7. A computer readable storage medium having at least one computer program to control a processor to perform a process comprising:

dialing calls to telephone numbers in a telephone number database;

disconnecting the calls upon determining whether the telephone numbers satisfy call qualifying criteria; and placing the telephone numbers satisfying the call qualifying criteria in a qualified number queue.

* * * * *